United States Patent [19]
Zag et al.

[11] Patent Number: 4,651,628
[45] Date of Patent: Mar. 24, 1987

[54] PISTON-CYLINDER ARRANGEMENT OF POLYGONAL CROSS SECTION

[75] Inventors: Heinz Zag, Heidenheim; Karl Steiner, Herbrechtingen; Josef Müllner; Hans Flämig, both of Heidenheim, all of Fed. Rep. of Germany

[73] Assignee: J. M. Voith GmbH, Fed. Rep. of Germany

[21] Appl. No.: 716,837

[22] Filed: Mar. 28, 1985

[30] Foreign Application Priority Data

Feb. 1, 1985 [DE] Fed. Rep. of Germany ....... 3503371

[51] Int. Cl.⁴ .............................. F16J 1/00; F01B 1/00
[52] U.S. Cl. .................................. 92/165 PR; 92/177; 92/193
[58] Field of Search ................... 92/165 PR, 177, 182, 92/193, 194

[56] References Cited
U.S. PATENT DOCUMENTS 1,363,894 12/1920 Molstad .
3,624,880 12/1971 Justus et al. .
3,901,131 8/1975 Prasse .............................. 92/193 X
4,080,877 3/1978 de Fries ............................ 92/177 X

FOREIGN PATENT DOCUMENTS 935104 10/1955 Fed. Rep. of Germany .
2853423 11/1982 Fed. Rep. of Germany .
1080615 8/1967 United Kingdom .
1511538 5/1978 United Kingdom .

Primary Examiner—Allen M. Ostrager
Attorney, Agent, or Firm—Ostrolenk, Faber, Gerb & Soffen

[57] ABSTRACT

A piston-cylinder arrangement, particularly useful for the press shoe of an extended nip press. The cylinder is a fluid pressure cylinder with a piston, which is fluid pressure reciprocated, disposed in the cylinder chamber. The cylinder and piston are polygonal around their peripheries. A circumferential groove in the cylinder wall carries a plurality of sealing pieces which are urged outwardly of the groove and against the periphery of the piston. The sealing pieces comprise corner pieces disposed at the corners of the polygonal cylinder and second sealing pieces joining the corner pieces. Where the corner and second sealing pieces meet around the periphery of the cylinder, they have overlying, overlapping surfaces that are oriented perpendicular to the reciprocation of the piston. A spring in the groove may urge some of the pieces outwardly toward the piston. Particular beveling or rounding of the slide surfaces of the sealing pieces and a particular thickness of the sealing pieces with respect to the groove are described.

17 Claims, 5 Drawing Figures

U.S. Patent   Mar. 24, 1987   4,651,628
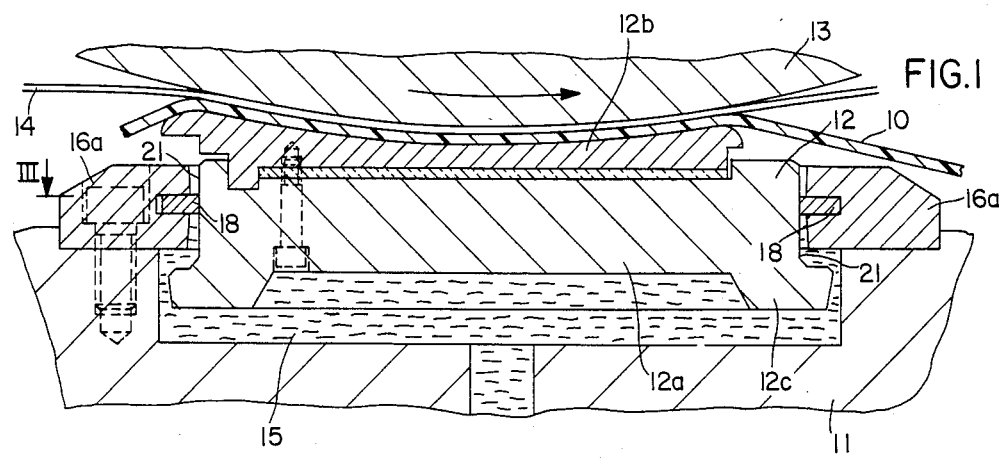
FIG. 1
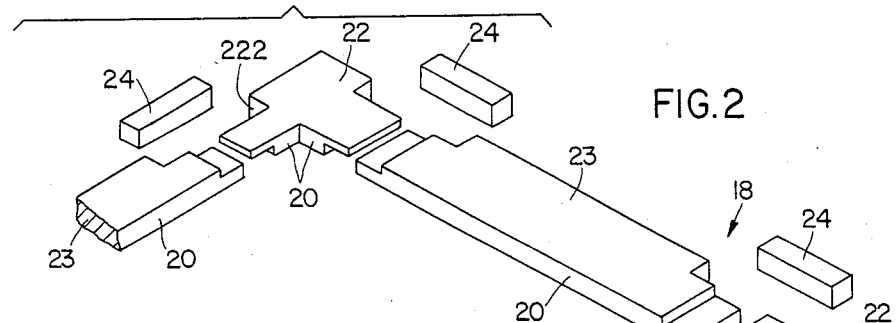
FIG. 2
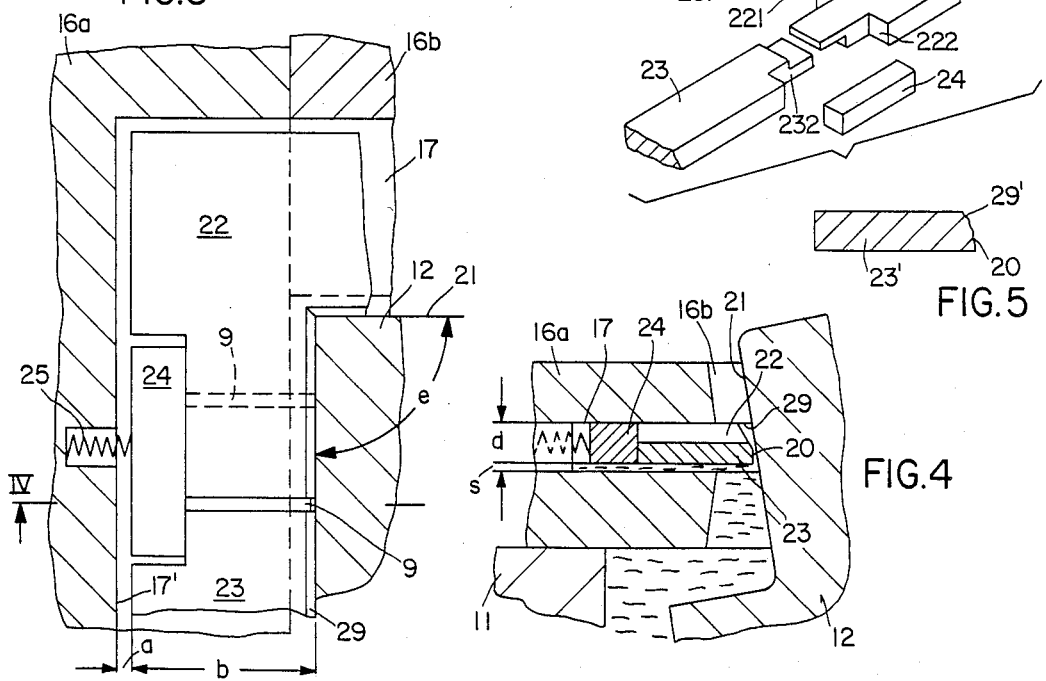
FIG. 3
FIG. 5
FIG. 4

PISTON-CYLINDER ARRANGEMENT OF POLYGONAL CROSS SECTION

BACKGROUND OF THE INVENTION

The invention relates to a piston-cylinder arrangement of polygonal cross-section and particularly to an arrangement where the piston reciprocates in a pressure liquid chamber, which is sealed by a seal around the piston in the cylinder.

Piston-cylinder arrangements of this kind are used in press rolls or in press-belt units in which a press roll shell or jacket or an endless press belt slides within the region of a press zone over a stationary press shoe. The press shoe is defined at the top of the piston of the piston-cylinder arrangement. That piston is located within a recess in a support member which extends through the interior space enclosed by the press roll jacket or the press belt. That recess forms the cylinder chamber of the piston-cylinder arrangement. Feeding of the pressure fluid into the cylinder chamber causes translation of the piston and produces the desired press shoe pressure in the press zone.

The element which slides over the press shoe may be, on the one hand, a metallic tubular press jacket, in which case the slide surface of the press shoe is of convex curvature, or, on the other hand, a flexible roll jacket or a flexible press belt, possibly traveling over guide rollers outside the press zone, in which case the slide surface of the press shoe is concave or substantially flat or convex, depending on the shape of the counter-pressing element, for instance, a counter-roll.

The present invention can be used in connection with all of the foregoing embodiments.

Federal Republic of Germany DE-OS No. 33 11 996 discloses an extended nip press having a piston-cylinder arrangement from which the present invention proceeds. The piston, which forms the press shoe, is there formed of a single piece. There is a problem of making the seal between the piston and the cylinder resilient so that the piston cannot only reciprocate but can also tilt somewhat. The piston must press the roll jacket firmly against the counter-roll. This produces the difficulty of having the seal assure a sufficient sealing off of the pressure space despite the block shape of the piston and despite the required resiliency of the seal.

Another extended nip press shown in U.S. Pat. No. Re. 30,268 has been attempted to circumvent these difficulties. In this case, the press shoe and the piston have been developed as separate structural parts. The press shoe is connected to the piston by means of an articulation or pivot. In this way, the press shoe can apply itself firmly against the counter-roll without the piston having to carry out a tilting movement within the cylinder. However, the articulation of the connections increases the cost of the construction.

Sag adjustment rolls which have a piston-cylinder arrangement of rectangular cross-section are known from U.S. Pat. No. 3,802,044, FIGS. 6 and 7, and from British Pat. No. 1,495,385. In the former case, the piston, which is the press shoe, is formed of a single part. In the latter case, the press shoe is connected to the piston by an articulation.

The object of the present invention is to develop a piston-cylinder arrangement of polygonal cross-section such that a high degree of sealing is assured despite the polygonal cross-sectional shape of the piston and despite the required resiliency of the seal which permits tilting of the piston within the cylinder. Upon use of the piston-cylinder arrangement for supporting a roll jacket or a press belt, the press shoe can be developed as a single piece with the piston or it can be connected rigidly to the piston without a tilt articulartion.

For use of the piston-cylinder arrangement in press devices of considerable length (on the order of magnitude of 5 to 10 m corresponding to the width of the web to be treated), there is a further requirement. In most cases, the piston, as seen in cross-section, is extremely large along its side corresponding to the length of the roll. It must, therefore, be expected that considerable differences in piston length in relation to cylinder length along the roll will occur in the event of even small differences in temperature between the piston and the support member which forms the cylinder chamber. Accordingly, the seal must be sufficiently resilient or movable that it is able to compensate for these differences in length.

A piston-cylinder arrangement according to the invention is of polygonal cross-section. Both the cylinder chamber wall and the piston periphery are polygonal, and they are correspondingly shaped polygons, e.g. rectangular. There is a cylinder chamber which is adapted to be filled with a pressure liquid. The cylinder chamber may be defined in a supporting member. A piston is disposed in the cylinder chamber for being reciprocated in that chamber, especially under the influence of the pressure liquid. The cylinder chamber has a wall around the piston, and the piston has a periperhy surrounded by the wall. Because the cylinder is polygonal in shape, it has a plurality of corners around its circumference and the piston is correspondingly externally profiled. The piston is sized and shaped so that there is a polygonal slot between the cylinder chamber wall and the piston periphery.

One, as between the cylinder chamber wall and the piston periphery, and most typically the cylinder chamber wall, has a circumferential groove defined in it which extends completely around the cylinder chamber. A seal is disposed in that circumferential groove for sealing off the polygonal slot between the cylinder chamber wall and the piston periphery. The seal includes a slide surface that is on the edge of the seal that projects out of the groove and that is in contact with the opposed surface on the other one of the piston and the cylinder chamber wall toward which the seal projects. As the cylinder is polygonal, adjacent ones of the slide surfaces meet at the corners of the respective one of the piston and the cylinder wall toward which the slide surfaces project, and the meeting slide surfaces define a respective corner angle in each corner of the piston-cylinder arrangement.

The seal itself is comprises of rigid material, and it comprises a plurality of sealing pieces. The sealing pieces are comprised of rigid material, and are typically metallic. The sealing pieces include a respective corner sealing piece at each corner of the piston-cylinder arrangement. Each corner sealing piece has two respective ones of the slide surfaces on it, which together form an angle with respect to each other at the corner angle. Extending away from each of two of the sides of the corner piece and also extending along the groove, there is a respective adjacent sealing piece, which is adjacent the corner sealing piece. A single one of the adjacent sealing pieces may extend between two neighboring corner sealing pieces. The corner sealing piece has a respective first overlap piece and the adjacent sealing piece has a second overlap piece, and the overlap pieces include respective overlapping surfaces which overlie each other. These overlapping surfaces extend substantially perpendicular to the direction of reciprocation of the piston in the cylinder chamber. At the respective first and second overlap pieces where the corner sealing piece and the adjacent sealing piece meet, the first and second overlap pieces both include a recess defined in them and facing toward the bottom of the groove. An auxiliary sealing piece is disposed in this recess, and that auxiliary piece covers the entire region of the first and second overlap pieces in the groove.

All of the above-described sealing pieces have a first thickness in the direction of reciprocation of the piston. The width of the groove is greater than the first thickness by an amount of a small slot. At least along one side of the piston, the sealing pieces are spaced outwardly a distance from the bottom of the groove.

Forming the seal from a metallically rigid material makes it possible to form corner seal pieces which assure a high degree of seal at the particularly critical corner points. Due to the required resiliency of the seal, however, two adjacent sealing pieces meeting at a corner cannot be rigidly connected to each other. Instead, in accordance with an important concept of the invention, they are overlapped, which permits relative mobility. Now, however, there is a danger that leakage gaps will be formed due to the relative mobility of the sealing pieces. Auxiliary sealing pieces are therefore provided. They are necessary for the following reasons. It has been found necessary to make the width of the groove within which the sealing pieces are inserted larger than the thickness of the sealing pieces by a small gap. Furthermore, the tiltability and thermal expansion of the piston require that there be a space between the sealing pieces and the bottom of the groove, at least along one of the two short sides and along one of the two long sides of the piston. Thus, without the auxiliary sealing pieces, there would be passageways from the cylinder chamber into the low pressure region via the leakage gaps and via the bottom of the groove. Thus, it would not be possible to develop sufficiently high pressures in the cylinder chamber.

The space between the sealing pieces and the bottom of the groove assures that at the same time the pressure liquid which acts on the piston also acts from the bottom of the groove against the sealing pieces and presses them against the mating slide surface of the piston or cylinder. This increases the tightness of the seal, and fewer spring elements are necessary in order to press the sealing piece slide surfaces against the mating slide surface.

In a further development of the invention, for at least some of the sealing pieces, the slide surface at which it contacts the other of the piston or the cylinder wall is of reduced thickness as compared with the thickness of the rest of that sealing piece. For reduced thickness, the material of the sealing piece at the slide surface is removed from the low pressure side, that is the outward facing side of the sealing piece, in order to reduce its thickness. This can be accomplished by beveling the slide surface or by rounding it.

BRIEF DESCRIPTION OF THE DRAWING

FIG. 1 is a partial section through an extended nip press having a piston-cylinder arrangement.

FIG. 2 shows some of the sealing pieces of the piston-cylinder arrangement of FIG. 1, seen in an oblique, exploded view.

FIG. 3 shows, on a larger scale, a partial section along the line III of FIG. 1.

FIG. 4 is a cross-section along the line IV of FIG. 3.

FIG. 5 is a cross-section through a sealing piece.

DESCRIPTION OF A PREFERRED EMBODIMENT

FIG. 1 shows an endless, flexible press belt 10 of an extended nip press of a paper making machine, although the invention is not limited to use in any specific application. The belt 10 travels around a stationary support member 11. As described above, the path of travel of the press belt 10 can be approximately circular, in case it is a tube-shaped press-roll jacket. Alternatively, the press belt can be conducted over several guide rollers. In either case, the press belt 10 is pressed against a counter-roll 13 (or against a second press belt, not shown) by means of a press shoe 12, which has a concave outer or upper slide surface. A felt belt 14, together with a web of paper from which the water is to be removed, pass through the extended press zone formed thereby. In the direction perpendicular to the plane of the drawing, the press belt 10, the support member 11, the press shoe 12 and the counter-roll 13 extend over the entire width of the felt belt 14 and of the paper web. The direction of travel is indicated by an arrow in the counter-roll 13.

The piston-cylinder arrangement of the invention is now described. The support member 11 has a substantially box-shaped recess 15 which serves as a cylinder into which the press shoe 12 is inserted and acts as a piston. The peripheral wall of this cylinder recess 15 is not flat and straight. It is narrower in polygonal cross-section at the below described groove 17 and tapers wider in cross-section both above and below its narrower part.

The press shoe is formed of a lower part 12a and an upper part 12b. The two parts are rigidly screwed to each other. Aside from the outer surface of the upper part 12b, which is adapted to the shape of the counter-roll, and a flange 12c formed on the lower part 12a, the press shoe 12 is substantially of box shape, and rectangular in cross-section.

Along the edge of the box-shaped cylinder chamber 15, there are fastened to the support member 11 strip-like sealing supports comprising two lengthwise sealing supports 16a and two transverse sealing supports 16b. Into each of these sealing supports there extends a groove 17 (FIG. 4) of rectangular cross-section, which is open inwardly, toward the piston 12. All of these grooves 17 lie at the same height so that they can receive a continuous seal 18 which extends around the entire periphery of the piston 12.

The seal 18 is formed of a plurality of individual sealing pieces 22 and 23, which are preferably made of a rigid, metallic material, for instance, bronze. In order that the sealing pieces 22, 23 can be pressed against the piston 12 by the pressure prevailing within the cylinder chamber 15, the width of the grooves 17 is made larger by a slot s than the thickness d of the sealing pieces. For the same reason, the width b of the sealing pieces and the depth of the grooves 17 are so selected that a distance a remains between the sealing pieces and the bottom 17' of the groove. This is necessary also for other reasons. On the one hand, it must be expected that the piston or press shoe 12 can tilt slightly, at least temporarily, as is shown in greatly exaggerated fashion in FIG. 4. On the other hand, it must be expected that, in operation of the extended nip press, the press shoe will become more strongly heated than the support member 11 so that the press shoe 12 will expand more.

Each sealing piece has a slide surface 20 which is in contact with a mating slide surface 21 of the piston 12. In order that this contact be assured also at the four corners of the piston 12, the seal 18 comprises, inter alia, the four corner seal pieces 22. Each of these corner seal pieces has two slide surfaces 20 which meet at a right angle. These slide surfaces are adapted, as accurately as possible, to the corresponding corner angles e (FIG. 3) of the piston. This is more easily possible the shorter are the arms of the corner sealing pieces 22. For this reason, at least one straight sealing piece 23 is provided between every two neighboring corner sealing pieces 22.

The ends of the sealing pieces 22, 23 are stepped so as to overlap each other. In this connection, it is important that it is the thickness d of the sealing pieces 22, 23 and not the width b which is stepped. Therefore, the so-called overlap surfaces 221 and 231, respectively, which are produced by the stepping and which contact each other are not parallel to the direction of stroke of the piston 12 but are perpendicular to it. At least after a certain amount of thermal expansion of the piston 12, the end surfaces of two adjacent sealing pieces will not be in contact with each other, but a leakage gap 9 will establish itself between them. Then, only the overlap surfaces 221 and 231 of adjacent sealing pieces are in contact with each other. The arrangement of the overlap surfaces which has been described assures that the leakage gaps 9 do not extend along the mating slide surfaces 21 of the piston 12 but instead extend transversely thereto, i.e. along the side walls of the grooves 17. In this way, the leakage gaps 9 in the region of the bottom 17' of the groove can be sealed by the following additional measures.

In each overlap zone, the two overlapping sealing pieces 22 and 23 have recesses 222 and 232 respectively worked therein from the bottom of the groove. In each of these recesses, an auxiliary sealing piece 24, preferably in the form of a small block, is inserted. It covers the entire overlap zone and thus closes off the leakage gap 9 in the region of the bottom of the groove. Between each auxiliary sealing piece 24 and the sealing supports 16a and 16b, respectively, there is clamped a compression spring 25 which assures dependable application of the auxiliary sealing piece 24 against the sealing pieces 22 and 23. The compression springs 25, in addition to the pressure of the liquid, also produce the application of the sealing pieces 22 and 23 against the mating slide surface 21 of the piston 12.

It is desirable that the liquid pressure insofar as possible by itself, i.e. without assistance of the compression spring 25, press the sealing pieces 22, 23 against the piston, even in the event of an inclination of the piston 12, which is shown greatly exaggerated in FIG. 4. The following is therefore provided. The slide surfaces 20 of the sealing pieces are beveled from the low pressure side (i.e. from the top in FIGS. 1 and 4), producing oblique surfaces 29 in FIGS. 3 and 4. (These oblique surfaces are not shown in FIGS. 1 and 2.) The width of the oblique surfaces 29 is smaller than the thickness d of the sealing pieces 22, 23, so that a part of the original slide surface 20 remains. Upon tilting of the piston 12, the beveling causes only the remaining part of the slide surface 20 to be acted upon by the liquid pressure. In other words, the pressure forces that act from the bottom 17' of the groove against the sealing pieces 22 and 23 are greater than the pressure forces acting in the opposite direction, i.e. on the remaining slide surfaces 20. A step worked at the same place into the sealing pieces or a rounding 29, as shown in the case of the sealing piece 23' in FIG. 4, would have the same effect as the above-described beveling 29 of the sealing pieces 22, 23.

FIG. 1 shows that the piston 12 is carried along a short distance in the direction of travel by the rotation press jacket until the sealing pieces 18 present on the discharge side, on the right-hand side of FIG. 1, rest against the bottom of the groove. On the discharge side, therefore, a sufficient seal is assured solely by this slight transverse displacement of the piston 12. Thus, in general the above-described beveling or stepping of the slide surface 20 of the sealing pieces 22, 23 is unnecessary in this case.

Although the present invention has been described in connection with a preferred embodiment thereof, many variations and modifications will now become apparent to those skilled in the art. It is preferred, therefore, that the present invention be limited not by the specific disclosure herein, but only by the appended claims.

What is claimed is:

1. A piston-cylinder arrangement of polygonal cross-section, including a cylinder chamber of polygonal shape, the cylinder chamber being adapted for being filled with pressure liquid, the polygonal cylinder having a plurality of corners around its circumference; and including a piston for reciprocating in the cylinder chamber and under the influence of the pressure liquid therein; the piston having a polygonal shape generally corresponding to that of the cylinder; the cylinder chamber having a wall around the piston, and the piston having a periphery surrounded by the wall; the piston being shaped and sized such that there is a polygonal slot between the cylinder chamber wall and the piston periphery;

one of the cylinder chamber wall and the piston periphery having a circumferential groove defined in it and extending around the cylinder chamber; a seal disposed in the circumferential groove for sealing off the polygonal slot between the cylinder chamber wall and the piston; the seal having slide surfaces projecting out of the groove and in contact with the other of the piston surface and the cylinder chamber wall toward which the seal projects; adjacent ones of the slide surfaces at the various sides of the polygonal seal meeting at the corners of the respective one of the piston and the cylinder toward which the slide surfaces project, and the meeting slide surfaces defining a respective corner angle in each corner of the piston-cylinder arrangement;

the seal is comprised of rigid material and comprises a plurality of sealing pieces, including:

a respective corner sealing piece at each corner of the piston-cylinder arrangement, the corner sealing pieces each having two respective ones of the slide surfaces which together form an angle with respect to each other at the corner angles;

extending away from each of two sides of the corner piece and along the groove, there are two adjacent sealing pieces which are adjacent the corner sealing piece; the corner sealing piece forming a respective first overlap piece and the adjacent sealing piece also forming a second overlap piece, the first and second overlap pieces include respective overlapping surfaces which overlie each other, and the overlapping surfaces extend substantially perpendicular to the direction of reciprocation of the piston in the cylinder chamber;

at the respective first and second overlap pieces, where the corner sealing piece and the adjacent sealing piece meet, the first and second overlap pieces both include a recess defined in them and facing toward the bottom of the groove; an auxiliary sealing piece disposed in the recess, and the auxiliary sealing piece covering the entire region of the first and second overlap pieces;

the sealing pieces having a first thickness in the direction of reciprocation of the piston, and the groove width being greater than the first thickness by a slot amount; at least along one side of the piston, the sealing pieces there are spaced outward a distance from the bottom of the groove.

2. The piston-cylinder arrangement of claim 1, wherein the groove is defined in the cylinder chamber wall, and the sealing member slide surfaces ride on the periphery of the piston.

3. The piston-cylinder arrangement of claim 1, wherein for at least some of the sealing pieces, the slide surface is of reduced thickness, as compared with the thickness of the rest of the respective sealing piece, and the material of the sealing piece at the slide surface is removed from the low pressure side of the sealing piece to define the reduced thickness.

4. The piston-cylinder arrangement of claim 3, wherein the groove is defined in the cylinder chamber wall, and the sealing member slide surfaces ride on the periphery of the piston.

5. The piston-cylinder arrangement of claim 3, wherein the low pressure side of the sealing piece is the side facing out of the recess.

6. The piston-cylinder arrangement of claim 5, wherein the slide surface is beveled to define the reduced thickness slide surface.

7. The piston-cylinder arrangement of claim 5, wherein the slide surface is rounded to define the reduced thickness slide surface.

8. The piston-cylinder arrangement of claim 3, further comprising compression spring means in the groove for pressing at least some of the sealing pieces out of the groove.

9. The piston-cylinder arrangement of claim 1, wherein the sealing pieces are made of metallic, rigid material.

10. The piston-cylinder arrangement of claim 1, further comprising compression spring means in the groove for pressing at least some of the sealing pieces out of the groove.

11. The piston-cylinder arrangement of claim 10, wherein the groove is defined in the cylinder chamber wall, and the sealing member slide surfaces ride on the periphery of the piston.

12. The piston-cylinder arrangement of claim 10, wherein the compression spring means acts against at least one of the auxiliary sealing pieces.

13. The piston-cylinder arrangement of claim 1, wherein extending between two of the corner sealing pieces, there is a single adjacent sealing piece having only one of the slide surfaces defined thereon and the one adjacent sealing piece joining those two corner sealing pieces.

14. The piston-cylinder arrangement of claim 13, wherein the one slide surface is a flat surface.

15. The piston-cylinder arrangement of claim 13, wherein the groove is defined in the cylinder chamber wall, and the sealing member slide surfaces ride on the periphery of the piston.

16. The piston-cylinder arrangement of claim 2, wherein the cylinder wall in the vicinity of the groove projects furthest toward the piston and the cylinder wall gradually inclines away from the piston above and below the groove in the cylinder wall, which accommodates pressure fluid controlled rocking of the piston in the cylinder.

17. The piston-cylinder arrangement of claim 1, wherein the overlap pieces are defined at the ends of the adjacent sealing pieces and at edges of the corner sealing pieces.

* * * * *